(12) United States Patent
Maeda et al.

(10) Patent No.: US 8,780,701 B2
(45) Date of Patent: Jul. 15, 2014

(54) COMMUNICATION APPARATUS AND PACKET DISTRIBUTION METHOD

(75) Inventors: Takuya Maeda, Kanazawa (JP); Shigemori Ookawa, Hakusan (JP)

(73) Assignee: Fujitsu Limited, Kawasaki-Shi (JP)

( * ) Notice: Subject to any disclaimer, the term of this patent is extended or adjusted under 35 U.S.C. 154(b) by 56 days.

(21) Appl. No.: 13/484,969

(22) Filed: May 31, 2012

(65) Prior Publication Data

US 2012/0307628 A1   Dec. 6, 2012

(30) Foreign Application Priority Data

Jun. 6, 2011   (JP) .................................. 2011-126482

(51) Int. Cl.
*H04L 12/28* (2006.01)
*H04J 3/17* (2006.01)
*H04J 3/00* (2006.01)

(52) U.S. Cl.
USPC ........... 370/225; 370/351; 370/433; 370/464; 370/912

(58) Field of Classification Search
USPC ......... 370/215, 225, 229, 235, 236, 351, 389, 370/392, 464, 912; 398/1, 2, 5, 9, 10, 13, 398/17, 20
See application file for complete search history.

(56) References Cited

U.S. PATENT DOCUMENTS

| | | | |
|---|---|---|---|
| 2003/0030866 A1* | 2/2003 | Yoo ................................ | 359/128 |
| 2005/0276263 A1 | 12/2005 | Suetsugu et al. | |
| 2006/0120718 A1* | 6/2006 | Natori .............................. | 398/19 |
| 2008/0112312 A1* | 5/2008 | Hermsmeyer et al. ........ | 370/228 |
| 2009/0016267 A1* | 1/2009 | Otsubo et al. .................. | 370/328 |
| 2012/0281525 A1* | 11/2012 | Addanki et al. ............... | 370/225 |

FOREIGN PATENT DOCUMENTS

| | | |
|---|---|---|
| JP | 2006-5437 | 1/2006 |
| JP | 2006-115392 | 4/2006 |

OTHER PUBLICATIONS

"Amendment to Carrier Sense Multiple Access with Collision Detection (CSMA/CD) Access Method and Physical Layer Specifications", LAN MAN Standards Committee, IEEE, Published Jun. 28, 2000, New York, NY, pp. 183.
"Link Aggregation", LAN MAN Standards Committee, IEEE Published Nov. 3, 2008, New York, NY, pp. 163.
"Part 3: Carrier Sense Multiple Access with Collision Detection (CSMA/CD) Access Method and Physical Layer Specifications", IEEE, copyright 2002, pp. 379.

* cited by examiner

*Primary Examiner* — Omar Ghowrwal
(74) *Attorney, Agent, or Firm* — Staas & Halsey LLP

(57) ABSTRACT

A communication apparatus includes a high-priority link configured to transmit one or more high-priority packets that have a priority level greater than or equal to a given level; a plurality of low-priority links that are optically coupled to the same transmission destination as the high-priority link and are configured to transmit one or more low-priority packets that have a priority level less than the given level; a first distribution circuit configured to select the one or more high-priority packets from among input packets and distribute the selected one or more high-priority packets to the high-priority link; and a second distribution circuit configured to individually distribute one or more remaining input packets, which are the input packets that have not been distributed to the high-priority link by the first distribution circuit, to the plurality of low-priority links based on distribution information about distributing packets to the plurality of low-priority links.

11 Claims, 23 Drawing Sheets

FIG. 2

| MAC | DESTINATION | 110 |
|---|---|---|
| MA | W | |
| MB | LA | |
| MC | LA | |
| MD | LA | |
| ME | A | |

(Table 110: columns MAC, DESTINATION)

| MAC | DESTINATION |
|---|---|
| MA | W |
| MB | LA |
| MC | LA |
| MD | LA |
| ME | A |

FIG. 4

| LINK | LINK PRIORITY ORDER |
|---|---|
| W | 4 |
| X | 3 |
| Y | 2 |
| Z | 1 |

| PACKET PRIORITY ORDER | PRIORITY LEVEL | LINK |
|---|---|---|
| 7 | HIGH | W |
| 6 | HIGH | W |
| 5 | MEDIUM | – |
| 4 | MEDIUM | – |
| 3 | MEDIUM | – |
| 2 | LOW | – |
| 1 | LOW | – |
| 0 | LOW | – |

| PACKET PRIORITY ORDER | PRIORITY LEVEL | LINK |
|---|---|---|
| 7 | HIGH | W |
| 6 | HIGH | W |
| 5 | LOW | – |
| 4 | LOW | – |
| 3 | LOW | – |
| 2 | LOW | – |
| 1 | LOW | – |
| 0 | LOW | – |

116

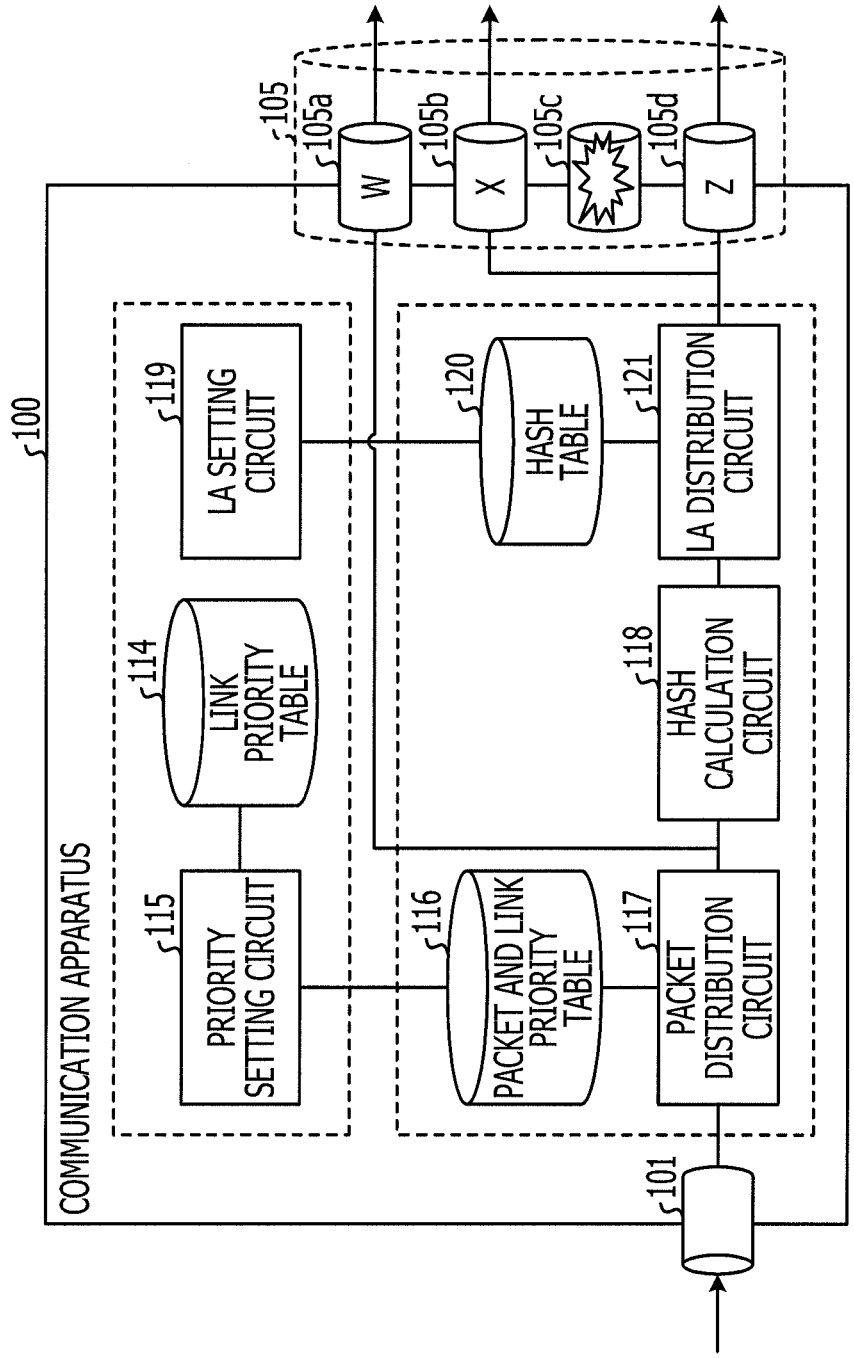

FIG. 12

| PACKET PRIORITY ORDER | PRIORITY LEVEL | LINK |
|---|---|---|
| 7 | HIGH | X |
| 6 | HIGH | X |
| 5 | LOW | – |
| 4 | LOW | – |
| 3 | LOW | – |
| 2 | LOW | – |
| 1 | LOW | – |
| 0 | LOW | – |

| PACKET PRIORITY ORDER | PRIORITY LEVEL | LINK |
|---|---|---|
| 7 | HIGH | V |
| 6 | HIGH | W |
| 5 | HIGH | W |
| 4 | LOW | – |
| 3 | LOW | – |
| 2 | LOW | – |
| 1 | LOW | – |
| 0 | LOW | – |

| PACKET PRIORITY ORDER | PRIORITY LEVEL | LINK |
|---|---|---|
| 7 | HIGH | V |
| 6 | HIGH | X |
| 5 | HIGH | X |
| 4 | LOW | – |
| 3 | LOW | – |
| 2 | LOW | – |
| 1 | LOW | – |
| 0 | LOW | – |

| HASH VALUE | LINK |
|---|---|
| 0 | Y |
| 1 | Z |

120

COMMUNICATION APPARATUS AND PACKET DISTRIBUTION METHOD

CROSS-REFERENCE TO RELATED APPLICATION(S)

This application is based upon and claims the benefit of priority of the prior Japanese Patent Application No. 2011-126482, filed on Jun. 6, 2011, the entire contents of which are incorporated herein by reference.

FIELD

The embodiments discussed herein are related to a communication apparatus and a packet distribution method.

BACKGROUND

Link aggregation (LA), which is known as a technique for using a plurality of physical lines as a single logical line, is standardized as IEEE 802.3ad. With LA, even if a failure occurs in one of the physical lines, communication may be continued with the remaining physical lines. Communication quality is therefore improved compared to communication where only a single physical line is used. In addition, with LA, because a plurality of physical lines is used as a single logical line, the bandwidth of all the physical lines may be used as the bandwidth of the logical line. Bandwidth may be therefore increased without using high-speed physical lines.

One example of a technique using LA include a technique that uses a hash function to determine one of a plurality of physical lines to be used in order to distribute traffic over the plurality of physical lines. Another example is a technique that assigns priority levels to connections between nodes, where the connections use LA, and when changing transmission paths selects one of the connections that has a low priority level in order to suppress the accompanying reduction in throughput when changing transmission paths.

Examples of related art include Japanese Laid-open Patent Publication Nos. 2006-115392 and 2006-5437.

SUMMARY

According to an aspect of the invention, a communication apparatus includes a high-priority link configured to transmit one or more high-priority packets that have a priority level greater than or equal to a given level; a plurality of low-priority links that are optically coupled to the same transmission destination as the high-priority link and are configured to transmit one or more low-priority packets that have a priority level less than the given level; a first distribution circuit configured to select the one or more high-priority packets from among input packets and distribute the selected one or more high-priority packets to the high-priority link; and a second distribution circuit configured to individually distribute one or more remaining input packets, which are the input packets that have not been distributed to the high-priority link by the first distribution circuit, to the plurality of low-priority links based on distribution information about distributing packets to the plurality of low-priority links.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of information stored in a MAC learning table;

FIG. 4 is a diagram illustrating an example of information stored in a link priority table;

FIG. 5 is a diagram illustrating an example of information stored in a packet and link priority table;

FIG. 8C is a diagram illustrating an example of information stored in the packet and link priority table in the case illustrated in FIG. 7;

FIG. 9 is a diagram describing the operation of the communication apparatus if a failure occurs in a low-priority LA transmission link;

FIG. 12 is a diagram illustrating an example of information stored in the packet and link priority table when a failure occurs in the high-priority LA transmission link;

FIG. 15C is a diagram illustrating an example of information stored in the packet and link priority table in the case illustrated in FIG. 14;

FIG. 17 is a diagram illustrating an example of information stored in the packet and link priority table when a failure occurs in the high-priority LA transmission link;

FIG. 18 is a diagram illustrating an example of information stored in the hash table when a failure occurs in the high-priority LA transmission link;

DESCRIPTION OF EMBODIMENTS

Embodiments of a communication apparatus and a packet distribution method will be described herein with reference to the accompanying drawings. The present invention is not limited to the following embodiments.

Figure 1:
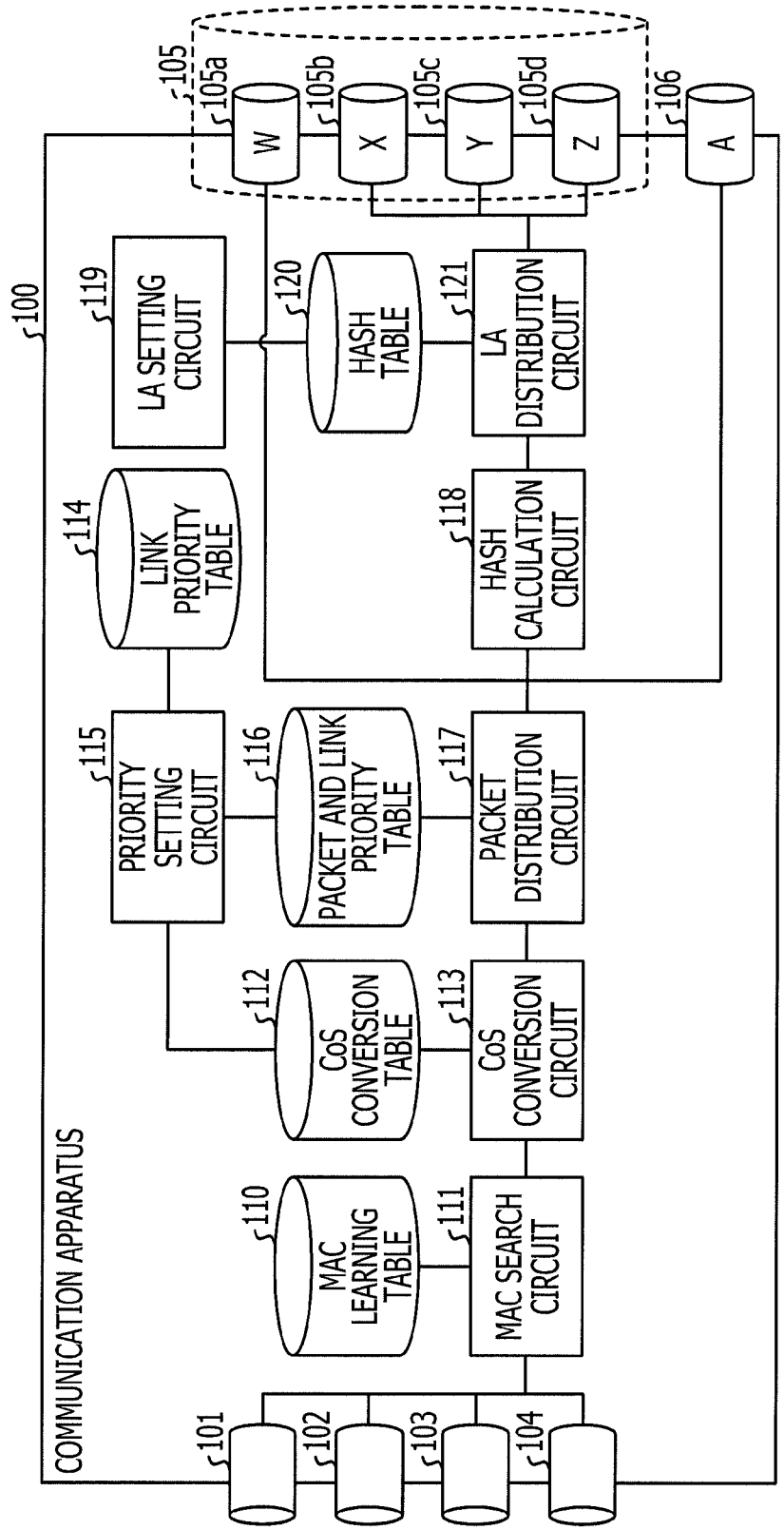
FIG. 1 is a diagram illustrating an example configuration of a communication apparatus.

The configuration of a communication apparatus according to an embodiment will be described with reference to FIG. 1. FIG. 1 is a diagram illustrating an example configuration of a communication apparatus according to a embodiment. For example, as illustrated in FIG. 1, a communication apparatus 100 is optically coupled to receiving links 101 to 104, link aggregation (LA) transmission link 105, and a transmission link 106. The communication apparatus 100 includes a media access control (MAC) learning table 110, a MAC search circuit 111, a class of service (CoS) conversion table 112, a CoS conversion circuit 113, a link priority table 114, a priority setting circuit 115, a packet and link priority table 116, a packet distribution circuit 117, a hash calculation circuit 118, an LA setting circuit 119, a hash table 120, and an LA distribution circuit 121. The communication apparatus 100 is, for example, a layer 2 (L2) switch.

The receiving links 101 to 104 are, for example, port terminals or interface cards for transmitting a packet to be input into the communication apparatus 100. The of receiving links is not limited to shown on FIG. 1. The LA transmission link 105 is, for example, a port terminal or an interface card for transmitting a packet output from the communication apparatus 100, and employs LA in which a plurality of lines are used as a single logical line. A plurality of lines included in the LA transmission link 105 are illustrated in FIG. 1 as LA transmission links 105a to 105d. The transmission link 106 is, for example, a port terminal or an interface card for transmitting a packet output from the communication apparatus 100, and is unlike the LA transmission link 105 in that LA is not used. The of transmission links is not limited to the shown on FIG. 1. Referring to FIG. 1, link identification information for the LA transmission links 105a to 105d and the transmission link 106 are illustrated as "W", "X", "Y", "Z", and "A", respectively.

Out of the LA transmission links 105a to 105d, the LA transmission link 105a, for example, receives distribution of packets input from the receiving links 101 to 104 without using the hash table 120. In addition, high-priority packets having a priority level equal to or higher than a given level are distributed to the LA transmission link 105a. However, out of the LA transmission links 105a to 105d, the LA transmission links 105b to 105d receive, for example, distribution of packets input from the receiving links 101 to 104 which is performed using the hash table 120. Packets that have not been distributed to the LA transmission link 105a are distributed to the LA transmission links 105b to 105d.

The MAC learning table 110, for example, stores and associates together the MAC address of an apparatus that is a packet transmission destination and the address of a link that transmits the packet. FIG. 2 is a diagram illustrating an example of information stored in the MAC learning table 110. Referring to FIG. 2, "MA", "MB", "MC", "MD", and "ME" represent the MAC addresses of destination apparatuses of packets transmitted via the LA transmission links 105a, 105b, 105c, and 105d, and the transmission link 106, respectively.

For example, the MAC learning table 110 stores and associates together the MAC address "MA" and an address of "W", the MAC address "MB" and an address of "LA", the MAC address "MC" and the address "LA", the MAC address "MD" and the address "LA", and the MAC address "ME" and an address of "A". The address "LA" does not include "W" representing the LA transmission link 105a to which packets are distributed without using the hash table 120.

The MAC search circuit 111, for example, upon receiving a packet that has been transmitted by one of the receiving links 101 to 104 and input into the communication apparatus 100, extracts, from the packet, the MAC address of an apparatus that is the transmission destination of the packet. The MAC search circuit 111 acquires, from the MAC learning table 110, the address of a link corresponding to the extracted MAC address. If the address is "LA", the MAC search circuit 111 determines that the packet is a target of hash calculation to be described later. Subsequently, the MAC search circuit 111 outputs the packet to the CoS conversion circuit 113.

Figure 3:
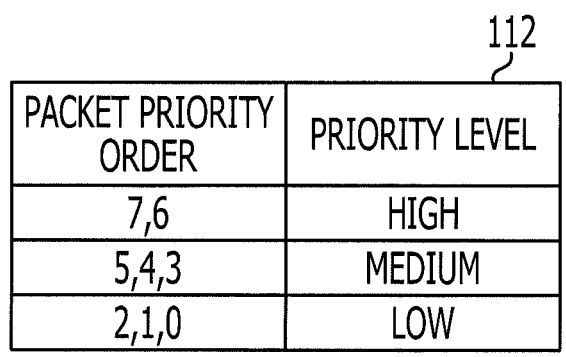
FIG. 3 is a diagram illustrating an example of information stored in a CoS conversion table.

The CoS conversion table 112, for example, stores and associates together the priority order and priority level of the packet. For example, information stored by the CoS conversion table 112 is set in advance by an administrator. FIG. 3 is a diagram illustrating an example of information stored in the CoS conversion table 112. For example, the CoS conversion table 112 stores and associates together packet priority orders of "7" and "6" with a priority level of "high", packet priority orders of "5", "4", and "3" with a priority level of "medium", and packet priority orders of "2", "1", and "0" with a priority level of "low". Referring to the example of the CoS conversion table 112 illustrated in FIG. 3, the larger the value of the packet priority order, the higher the priority level, but having the smaller the value of the packet priority, the lower the priority level as an approach may also be used.

The CoS conversion circuit 113, for example, extracts the packet priority order from the packet received from the MAC search circuit 111, acquires a priority level corresponding to the extracted packet priority order from the CoS conversion table 112, and notifies the packet distribution circuit 117 of a packet transmission queue. One example of a packet transmission queue system is where a packet transmission queue corresponding to a high-priority link is selected for a high-priority packet, and a packet transmission queue corresponding to a medium or low-priority link is selected for other packets. Subsequently, the CoS conversion circuit 113 outputs the packet to the packet distribution circuit 117.

Figure 4:
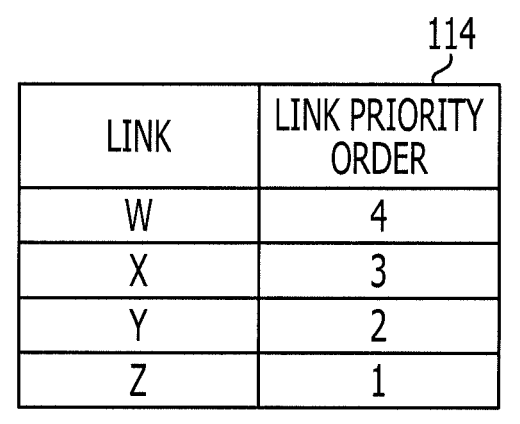

The link priority level table 114 stores link identification information of an LA transmission link for transmitting a packet output from the communication apparatus 100 and the priority level of each LA transmission link so that the link identification information and priority level are associated with each other. FIG. 4 is a diagram illustrating an example of information stored in the link priority table 114. For example, the link priority table 114 stores and associates together the link identification information "W" and a link priority order of "4", the link identification information "X" and a link priority order of "3", the link identification information "Y" and a link priority order of "2", and the link identification information "Z" and a link priority order of "1". Referring to the example of the link priority table 114 illustrated in FIG. 4, the larger the value of the link priority order, the higher the priority level. That is, in the example illustrated in FIG. 1, the LA transmission link 105a is an LA transmission link with a high link priority level to which packets are distributed with a method different from a method employed for the other LA transmission links.

The priority setting circuit 115, for example, based on the CoS conversion table 112 and the link priority table 114, stores and associates together the packet priority order, the priority level, and the link identification information in the packet and link priority table 116. When the above information is stored in the packet and link priority table 116, for example, the priority setting circuit 115 associates link identification information with only a packet priority order corresponding to a high priority level and stores the link identification information and the packet priority order in the packet and link priority table 116.

The packet and link priority table 116, for example, stores and associates together the packet priority order, the priority level, and the link identification information. FIG. 5 is a diagram illustrating an example of information stored in the packet and link priority table 116. For example, the packet and link priority table 116 stores and associates together the packet priority order "7", the priority level "high", and the link identification information "W"; the packet priority order "6", the priority level "high", and the link identification information "W"; the packet priority order "5" and the priority level "medium"; the packet priority order "4" and the priority level "medium"; the packet priority order "3" and the priority level "medium"; the packet priority order "2" and the priority level "low"; the packet priority order "1" and the priority level "low"; and the packet priority order "0" and the priority level "low".

The packet distribution circuit 117, for example, receives a packet and acquires, from the packet and link priority table 116, the link identification information of a LA transmission link corresponding to the packet based on the queue selection sent by the CoS conversion circuit 113 and outputs the packet to the corresponding LA transmission link. That is, in the example illustrated in FIG. 1, when the packet distribution circuit 117 acquires, from the packet and link priority table 116, the link identification information "W" representing the LA transmission link 105a, the packet distribution circuit 117 outputs the packet to the LA transmission link 105a. The packet distribution circuit 117 outputs a medium or low-priority packet to the hash calculation circuit 118 based on a queue selected by the CoS conversion circuit 113. Alternatively, the packet distribution circuit 117 outputs a packet, for which the link identification information of a corresponding LA transmission link is not set in the packet and link priority table 116, to the hash calculation circuit 118. The packet distribution circuit 117 outputs a packet to a transmission link other than the LA transmission links, if a link destination other than "LA" has been determined by the MAC search circuit 111 and link identification information is not set in the packet and link priority table 116. The transmission link other than the LA transmission links is, for example, the transmission link 106. Switching and so on of the LA transmission links will be described later.

The hash calculation circuit 118, for example, performs a hash calculation with keys that include a transmission destination address of a packet or a transmission source address of the packet, and notifies the LA distribution circuit 121 of the hash value. The LA setting circuit 119, for example, sets the hash table 120 in response to the addition or deletion of a link in the LA transmission link 105. The hash table 120, for example, stores and associates together a hash value and the identification information of an LA transmission link. The hash table 120 stores and associates together a hash value for each of the LA transmission links to which the packet is distributed based on a result of the hash calculation, and the identification information of the LA transmission link. That is, in the example illustrated in FIG. 1, the hash table 120 stores and associates together hash values for the LA transmission links 105b to 105d and the respective pieces of link identification information of the LA transmission links 105b to 105d.

Figure 6:
FIG. 6 is a diagram illustrating an example of information stored in a hash table.

FIG. 6 is a diagram illustrating an example of information stored in the hash table 120. For example, the hash table 120 stores and associates together the hash value "0" and the link identification information "X", the hash value "1" and the link identification information "Y", and the hash value "2" and the link identification information "Z".

The LA distribution circuit 121, for example, acquires, from the hash table 120, link identification information corresponding to the hash value sent by the hash calculation circuit 118 and distributes the packet to an LA transmission link corresponding to the acquired link identification information. For example, if the LA distribution circuit 121 is sent the hash value "0" by the hash calculation circuit 118, the LA distribution circuit 121 acquires the link identification information "X" from the hash table 120 and distributes the packet to the LA transmission link 105b, which corresponds to the acquired link identification information "X".

Next, processing performed when a failure occurs in an LA transmission link will be described with reference to FIGS. 7 to 16. In FIGS. 7, 9, 11, 14 and 16, for convenience of explanation, the only components in the communication apparatus 100 illustrated include the link priority table 114 to the LA distribution circuit 121, in addition to the LA transmission link 105 and receiving link 101.

Figure 7:
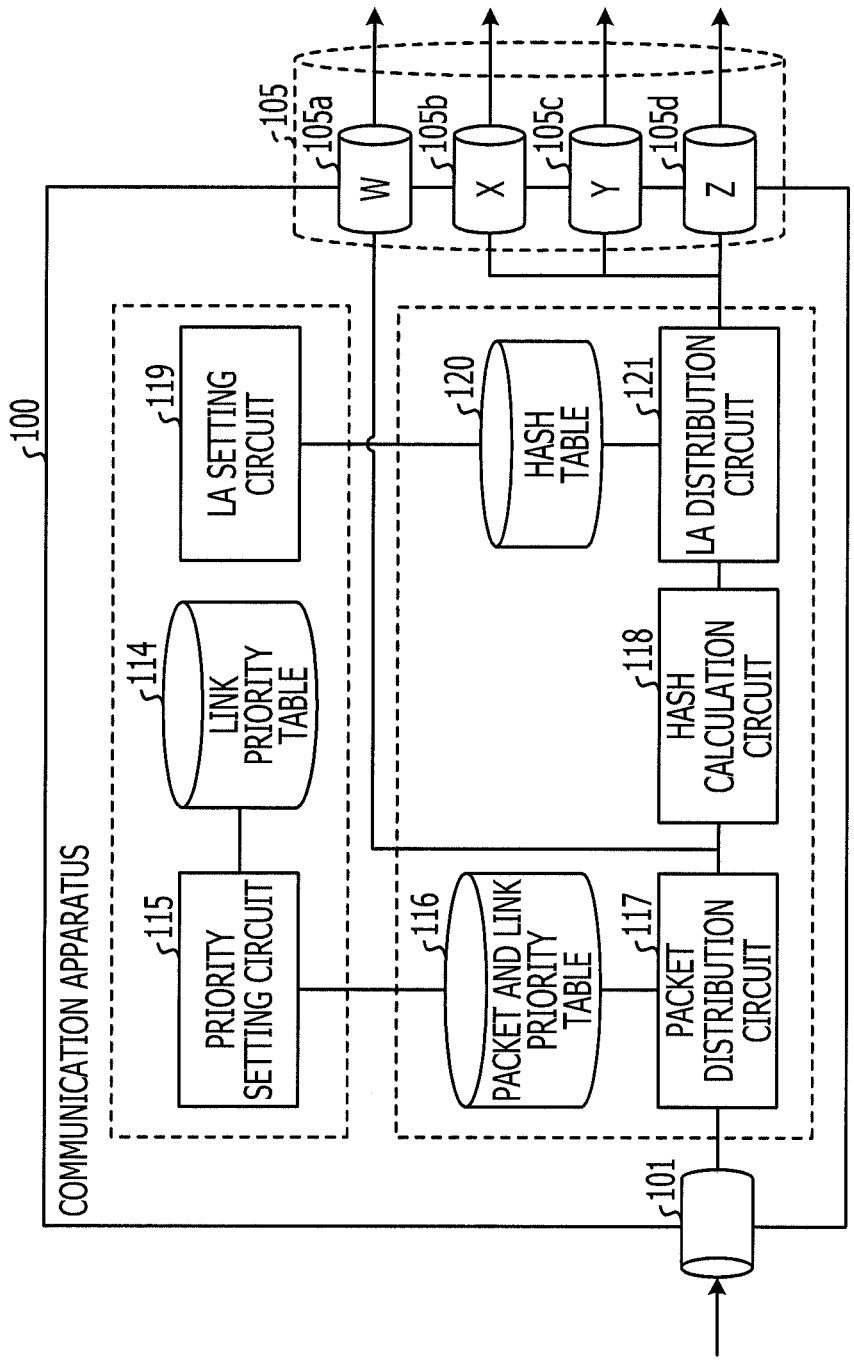
FIG. 7 is a diagram illustrating the behavior of the communication apparatus during normal operations.

FIG. 7 is a diagram describing the behavior of the communication apparatus 100 during normal operations. For example, as illustrated in FIG. 7, the LA transmission link 105 includes the LA transmission link 105a that is a high-priority link to which a packet is distributed under conditions different from conditions for the other links, and the LA transmission links 105b to 105d that are low-priority links. The link priority table 114, the priority setting circuit 115, and the LA setting circuit 119, which are surrounded by a broken line in FIG. 7, are, for example, realized under the control of software. In addition, the packet and link priority table 116, the packet distribution circuit 117, the hash calculation circuit 118, the hash table 120, and the LA distribution circuit 121, which are surrounded by a broken line in FIG. 7, are, for example, realized under the control of hardware.

Figure 8A:
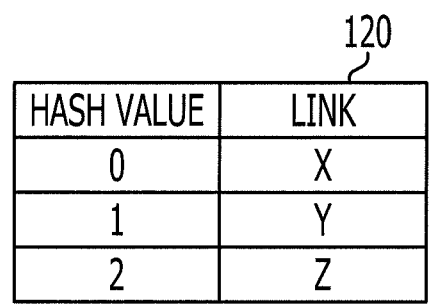
FIG. 8A is a diagram illustrating an example of information stored in the hash table in the case illustrated in FIG. 7.

Each table illustrated in FIG. 7 stores information as follows. FIG. 8A is a diagram illustrating an example of information stored in the hash table 120 in the example illustrated in FIG. 7. As illustrated in FIG. 8A, the hash table 120 stores and associates together the hash value "0" and the link identification information "X", the hash value "1" and the link identification information "Y", and the hash value "2" and the link identification information "Z".

Figure 8B:
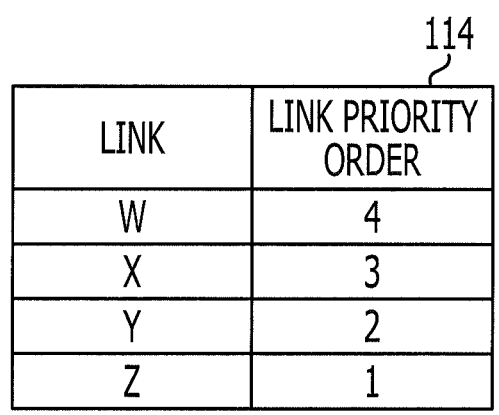
FIG. 8B is a diagram illustrating an example of information stored in the link priority table in the case illustrated in FIG. 7.

FIG. 8B is a diagram illustrating an example of information stored in the link priority table 114 in the example illustrated in FIG. 7. As illustrated in FIG. 8B, the link priority table 114 stores and associates together the link identification information "W" and the link priority order "4", the link identification information "X" and the link priority order "3", the link identification information "Y" and the link priority order "2", and the link identification information "Z" and the link priority order "1".

FIG. 8C is a diagram illustrating an example of information stored in the packet and link priority table 116 in the example illustrated in FIG. 7. As illustrated in FIG. 8C, the packet and link priority table 116 stores and associates together the packet priority order "7", the priority level "high", and the link identification information "W"; the packet priority order "6", the priority level "high", and the link identification information "W"; the packet priority order "5" and the priority level "low"; the packet priority order "4" and the priority level "low"; the packet priority order "3" and the priority level "low"; the packet priority order "2" and the priority level "low"; the packet priority order "1" and the priority level "low"; and the packet priority order "0" and the priority level "low" with each other, and stores them.

In the above structure, the packet distribution circuit 117 distributes a packet to the LA transmission link 105a or the LA transmission links 105b to 105d in accordance with the packet priority order of the packet. The LA distribution circuit 121 acquires, from the hash table 120, link identification information corresponding to a hash value sent by the hash calculation circuit 118 and distributes the packet to an LA transmission link corresponding to the acquired link identification information.

Next, the behavior of the communication apparatus 100 when a failure occurs in the LA transmission link 105c will be described with reference to FIG. 9. FIG. 9 is a diagram describing the operation of the communication apparatus 100 when a failure occurs in the LA transmission link 105c, which is a low-priority link. Referring to FIG. 9, a connection to the LA transmission link 105c, in which a failure has occurred, is lost. This does not necessarily represent that the LA transmission link 105c is physically disconnected, but represents that it is difficult or impossible to transmit a packet even if the packet is distributed to the LA transmission link 105c.

For example, if a failure occurs in the LA transmission link 105c, the LA setting circuit 119 resets the hash table 120 for the LA transmission links 105b and 105d that are remaining low-priority links. The communication apparatus 100 does not update the link priority table 114 or the packet and link priority table 116.

Figure 10:
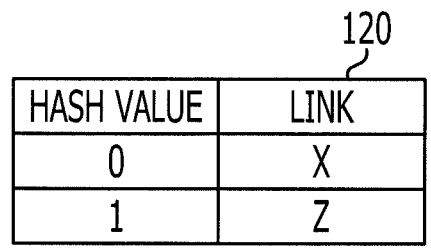
FIG. 10 is a diagram illustrating an example of information stored in the hash table when a failure occurs in the low-priority LA transmission link.

FIG. 10 is a diagram illustrating an example of information stored in the hash table 120 when a failure occurs in the LA transmission link 105c. For example, as illustrated in FIG. 10, the hash table 120 stores and associates together the hash value "0" and the link identification information "X", and the hash value "1" and the link identification information "Z". That is, when a failure occurs in the LA transmission link 105c, the LA setting circuit 119 deletes information corresponding to the LA transmission link 105c from the hash table 120 and resets information corresponding to the LA transmission link 105d in the hash table 120. The communication apparatus 100 stops the transfer of a packet at a stage prior to the hash calculation circuit 118 until the hash table 120 is completely reset. When the communication apparatus 100 stops the transfer of a packet at a stage prior to the hash calculation circuit 118, the packet distribution circuit 117 does not stop the distribution of a packet to the LA transmission link 105a, which is a high-priority link to which a high-priority packet is transmitted.

Figure 11:
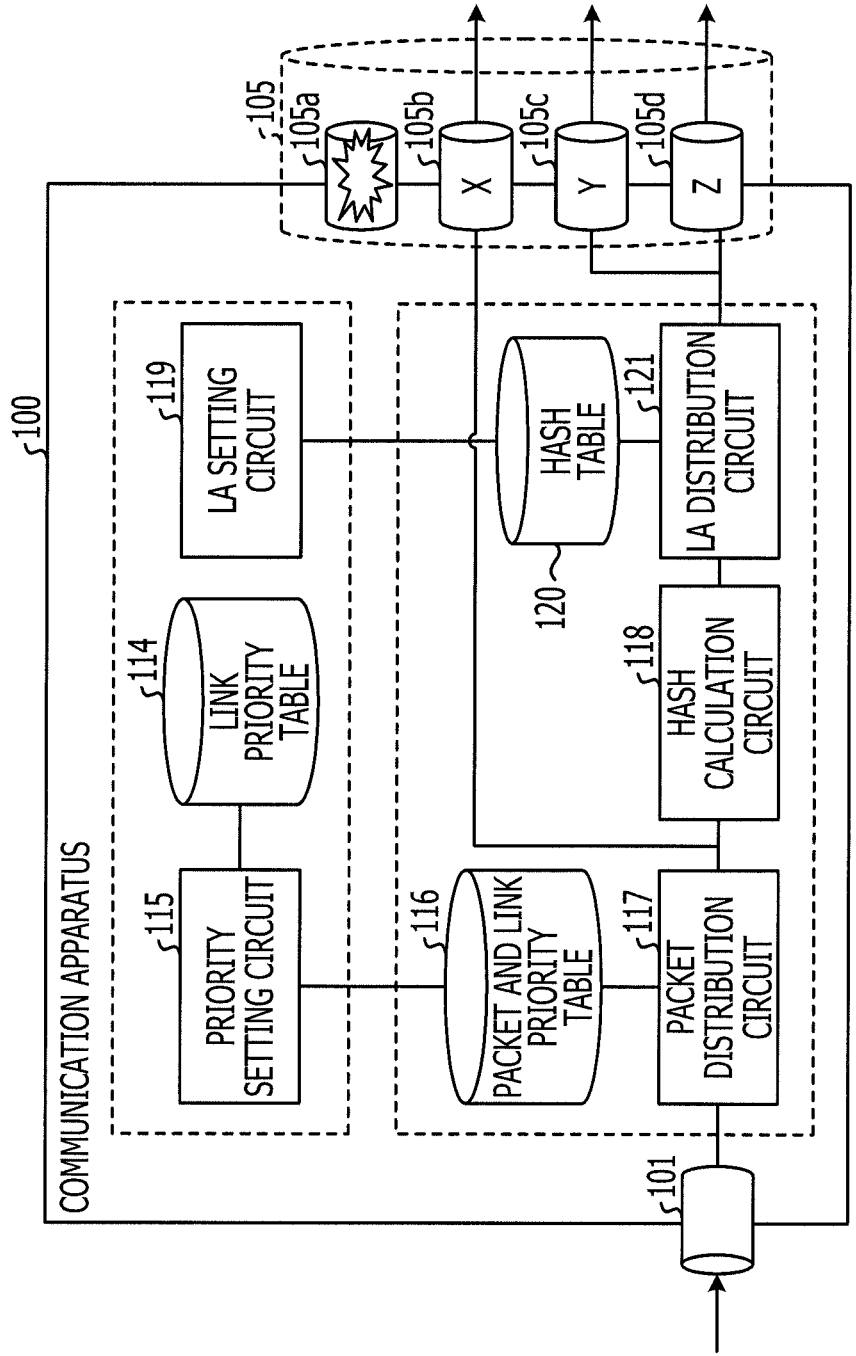
FIG. 11 is a diagram describing the operation of the communication apparatus if a failure occurs in a high-priority LA transmission link.

The operation of the communication apparatus 100 if a failure occurs in the LA transmission link 105a will be described with reference to FIG. 11. FIG. 11 is a diagram describing the behavior of the communication apparatus 100 when a failure occurs in the LA transmission link 105a, which is a high-priority link. Referring to FIG. 11, a connection to the LA transmission link 105a, in which a failure has occurred, is lost. This does not necessarily represent that the LA transmission link 105a is physically disconnected, but represents that it is difficult or impossible to transmit a packet even if the packet is distributed to the LA transmission link 105a.

For example, if a failure occurs in the LA transmission link 105a, the priority setting circuit 115 acquires, from the link priority table 114, the link identification information of one of the LA transmission links 105b to 105d having the highest priority level among the LA transmission links 105b to 105d. The priority setting circuit 115 sets the acquired link identification information in the packet and link priority table 116. For example, the priority setting circuit 115 acquires, from the link priority table 114, the link identification information "X" that is the link identification information of the LA transmission link 105b, which has the highest priority level among the LA transmission links 105b to 105d. The priority setting circuit 115 sets the acquired link identification information "X" of the LA transmission link 105b as an LA transmission link to which a packet having the priority level of "high" is transmitted in the packet and link priority table 116. That is, if a failure occurs in the LA transmission link 105a, a high-priority link, the priority setting circuit 115 selects a low-priority link having the highest priority level from among low-priority links to which a packet is distributed based on a result of hash calculation, and sets the selected low-priority link as a new high-priority link.

FIG. 12 is a diagram illustrating an example of information stored in the packet and link priority table 116 when a failure occurs in the LA transmission link 105a, which is a high-priority link. For example, as illustrated in FIG. 12, the packet and link priority table 116 stores and associates together the packet priority order "7", the priority level of "high", and the link identification information of "X"; the packet priority order of "6", the priority level of "high", and the link identification information of "X"; the packet priority order "5" and the priority level "low"; the packet priority order "4" and the priority level "low"; the packet priority order "3" and the priority level "low"; the packet priority order "2" and the priority level "low"; the packet priority order "1" and the priority level "low"; and the packet priority order "0" and the priority level "low". That is, the priority setting circuit 115 updates the packet and link priority table 116 by changing the link identification information "W", which corresponds to the LA transmission link 105a in which a failure has occurred, to the link identification information "X" corresponding to the LA transmission link 105b.

The LA setting circuit 119 resets the hash table 120 for the LA transmission links 105c and 105d, which are low-priority links other than the LA transmission link 105b, which has the highest priority level among the low priority links. The communication apparatus 100 does not update the link priority table 114.

Figure 13:
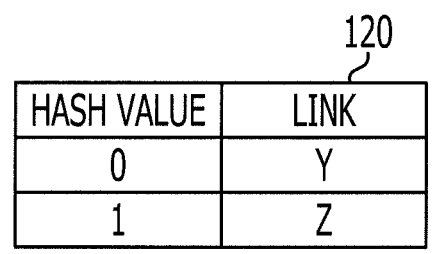
FIG. 13 is a diagram illustrating an example of information stored in the hash table when a failure occurs in the high-priority LA transmission link.

FIG. 13 is a diagram illustrating an example of information stored in the hash table 120 when a failure occurs in the LA transmission link 105a, which is a high-priority link. For example, as illustrated in FIG. 13, the hash table 120 stores and associates together the hash value "0" and the link identification information "Y", and the hash value "1" and the link identification information "Z". That is, when a failure occurs in the LA transmission link 105a, the LA setting circuit 119 deletes information corresponding to the LA transmission link 105b from the hash table 120 and resets information corresponding to the LA transmission links 105c and 105d in the hash table 120. The communication apparatus 100 stops the transfer of a packet at a stage prior to the hash calculation circuit 118 until the resetting of the hash table 120 is completed. When the resetting of the hash table 120 is completed and after the packet and link priority table 116 has been updated, the packet distribution circuit 117 may distribute a high-priority packet to the LA transmission link 105b that has been set as a new high-priority link.

Figure 14:
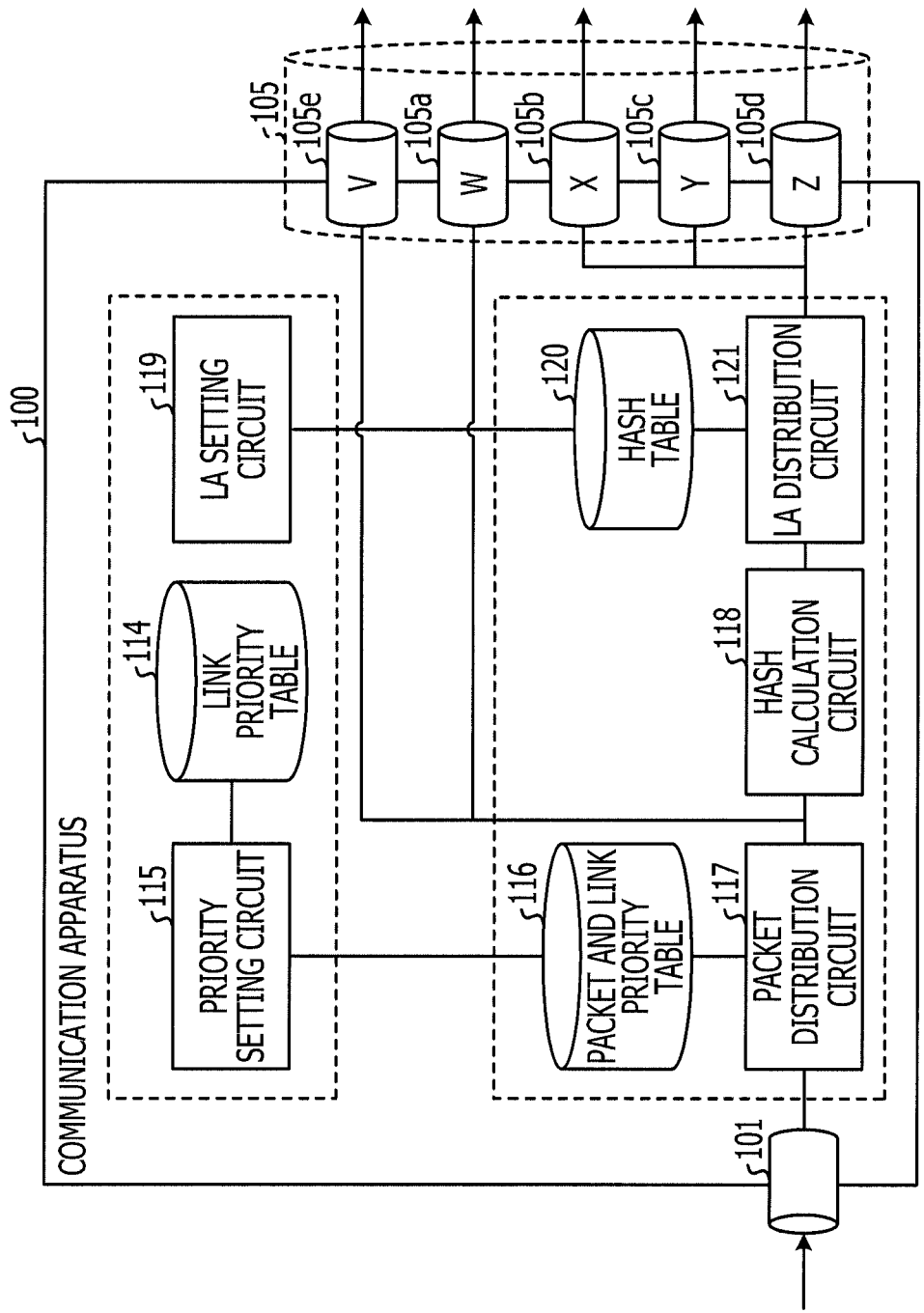
FIG. 14 is a diagram describing the behavior of the communication apparatus optically coupled to a plurality of high-priority LA transmission links during normal operations.

FIG. 14 is a diagram describing the behavior of the communication apparatus 100 optically coupled to a plurality of high-priority LA transmission links during normal operations. For example, as illustrated in FIG. 14, the LA transmission link 105 includes the LA transmission link 105a and an LA transmission link 105e, which are high-priority links to which a packet is distributed under conditions different from conditions for the other links, and the LA transmission links 105b to 105d, which are low-priority links. The link identification information for the LA transmission link 105e is "V".

Figure 15A:
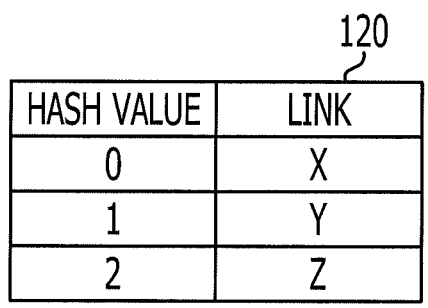
FIG. 15A is a diagram illustrating an example of information stored in the hash table in the case illustrated in FIG. 14.

Each table illustrated in FIG. 14 stores information as described below. FIG. 15A is a diagram illustrating an example of information stored in the hash table 120 in the case illustrated in FIG. 14. That is, as illustrated in FIG. 15A, the hash table 120 stores and associates together the hash value "0" and the link identification information "X", the hash value "1" and the link identification information "Y", and the hash value "2" and the link identification information "Z".

Figure 15B:
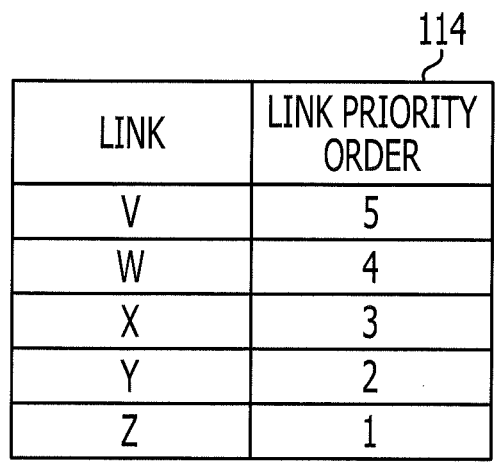
FIG. 15B is a diagram illustrating an example of information stored in the link priority table in the case illustrated in FIG. 14.

FIG. 15B is a diagram illustrating an example of information stored in the link priority table 114 in the case illustrated in FIG. 14. That is, as illustrated in FIG. 15B, the link priority table 114 stores and associates together the link identification information "V" and the link priority order "5", the link identification information "W" and link priority order "4", the link identification information "X" and link priority order "3", the link identification information "Y" and link priority order "2", and the link identification information "Z" and link priority order "1".

FIG. 15C is a diagram illustrating an example of information stored in the packet and link priority table 116 in the case illustrated in FIG. 14. That is, as illustrated in FIG. 15C, the packet and link priority table 116 stores and associates together the packet priority order "7", the priority level "high", and the link identification information of "V"; the packet priority order "6", the priority level "high", and the link identification information "W"; the packet priority order "5", the priority level "high", and the link identification information "W"; the packet priority order "4" and the priority level "low"; the packet priority order "3" and the priority level "low"; the packet priority order "2" and the priority level "low"; the packet priority order "1" and the priority level "low"; and the packet priority order "0" and the priority level "low".

The packet distribution circuit 117 distributes a packet to the LA transmission link 105a or 105e or the LA transmission links 105b to 105d in accordance with the packet priority order of the packet. The LA distribution circuit 121 acquires, from the hash table 120, link identification information corresponding to a hash value sent by the hash calculation circuit 118 and distributes the packet to an LA transmission link corresponding to the acquired link identification information.

Figure 16:
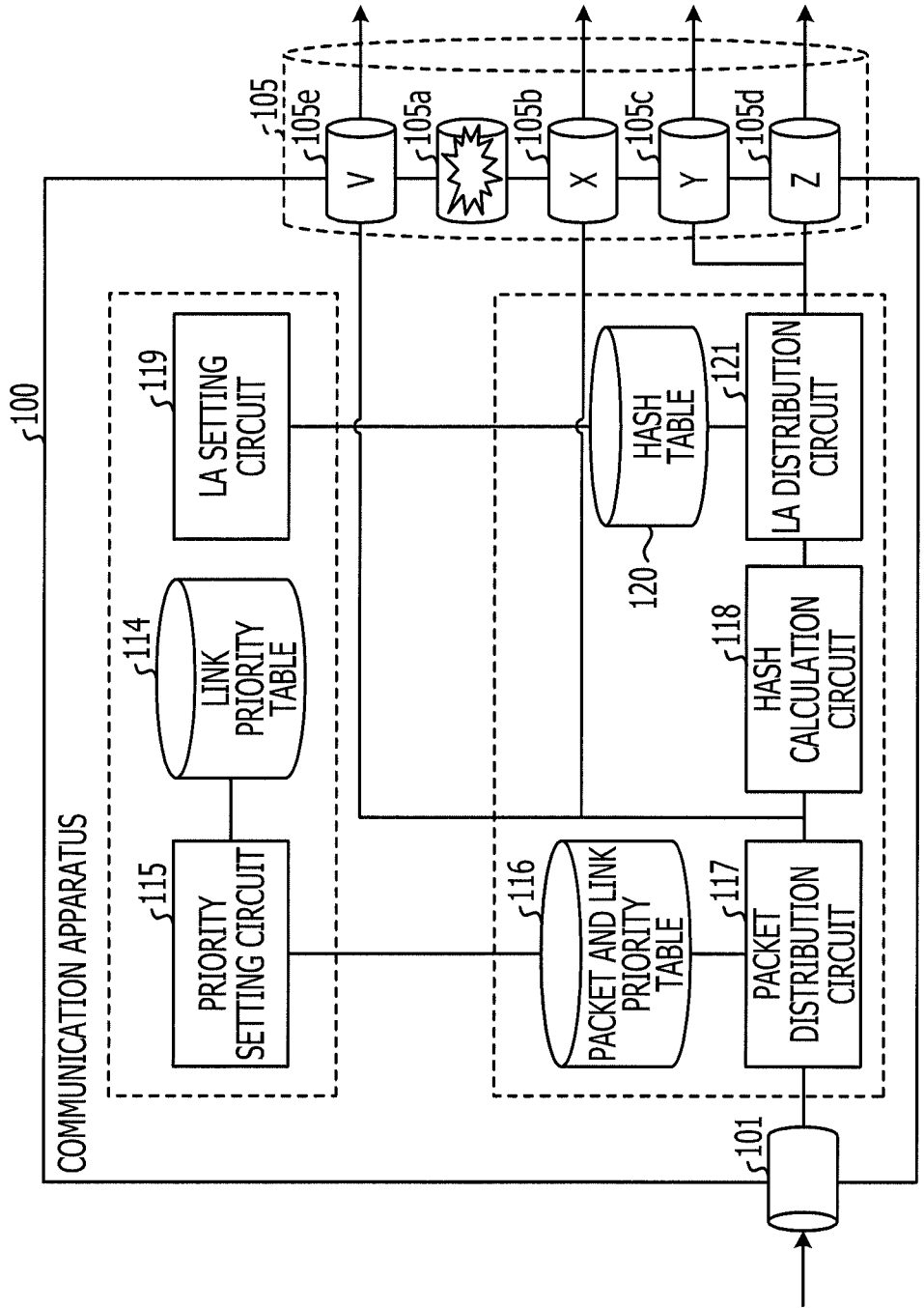
FIG. 16 is a diagram describing the behavior of the communication apparatus if a failure occurs in one of the high-priority LA transmission links.

The operation of the communication apparatus 100 if a failure occurs in the LA transmission link 105a will be described with reference to FIG. 16. FIG. 16 is a diagram describing the operation of the communication apparatus 100 if a failure occurs in the LA transmission link 105a, which is a high-priority link. Referring to FIG. 16, a connection is lost to the LA transmission link 105a in which a failure has occurred. This does not necessarily represent that the LA transmission link 105a is physically disconnected, but represents that it is difficult or impossible to transmit a packet even if the packet is distributed to the LA transmission link 105a.

For example, if a failure occurs in the LA transmission link 105a, the priority setting circuit 115 acquires, from the link priority table 114, the link identification information of a link having the highest priority level among the LA transmission links 105b to 105d. The priority setting circuit 115 sets the acquired link identification information in the packet and link priority table 116. For example, the priority setting circuit 115 acquires the link identification information "X" of the LA transmission link 105b, which has the highest priority level among the LA transmission links 105b to 105d. The priority setting circuit 115 sets the acquired link identification information "X" of the LA transmission link 105b as an LA transmission link to which a packet having the priority level "high" is transmitted in the packet and link priority table 116. That is, if a failure occurs in the LA transmission link 105a that is a high-priority link, the priority setting circuit 115 selects a low-priority link having the highest priority level from among low-priority links, to which a packet is distributed based on a result of hash calculation, and sets the selected low-priority link as a new high-priority link.

FIG. 17 is a diagram illustrating an example of information stored in the packet and link priority table 116 when a failure occurs in the LA transmission link 105a that is a high-priority link. For example, as illustrated in FIG. 17, the packet and link priority table 116 stores and associates together the packet priority order "7", the priority level "high", and the link identification information "V"; the packet priority order "6", the priority level "high", and the link identification information "X"; the packet priority order "5", the priority level "high", and the link identification information "X"; the packet priority order "4" and the priority level "low"; the packet priority order "3" and the priority level "low"; the packet priority order "2" and the priority level "low"; the packet priority order "1" and the priority level "low"; and the packet priority order "0" and the priority level "low". That is, the priority setting circuit 115 updates the packet and link priority table 116 by changing the link identification information "W" corresponding to the LA transmission link 105a, in which a failure has occurred, to the link identification information "X" corresponding to the LA transmission link 105b.

The LA setting circuit 119 resets the hash table 120 for the LA transmission links 105c and 105d, which are low-priority links other than the LA transmission link 105b, which has the highest priority level among them. The communication apparatus 100 does not update the link priority table 114.

Figure 18:
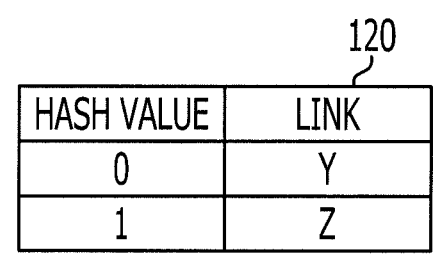

FIG. 18 is a diagram illustrating an example of information stored in the hash table 120 when a failure occurs in the LA transmission link 105a, which is a high-priority link. For example, as illustrated in FIG. 18, the hash table 120 stores and associates together the hash value "0" and the link identification information "Y", and the hash value "1" and the link identification information "Z". That is, when a failure occurs in the LA transmission link 105a, the LA setting circuit 119 deletes information corresponding to the LA transmission link 105b from the hash table 120 and resets information corresponding to the LA transmission links 105c and 105d in the hash table 120. The communication apparatus 100 stops the transfer of a packet at a stage prior to the hash calculation circuit 118 until the resetting of the hash table 120 is completed. When the resetting of the hash table 120 is complete, and after the packet and link priority table 116 has been updated, the packet distribution circuit 117 may distribute a high-priority packet to the LA transmission link 105b, which has been set as a new high-priority link. The packet distribution circuit 117 does not stop the distribution of high-priority packets to the LA transmission link 105e, which is a high-priority link that high-priority packets may be transmitted to.

Figure 19:
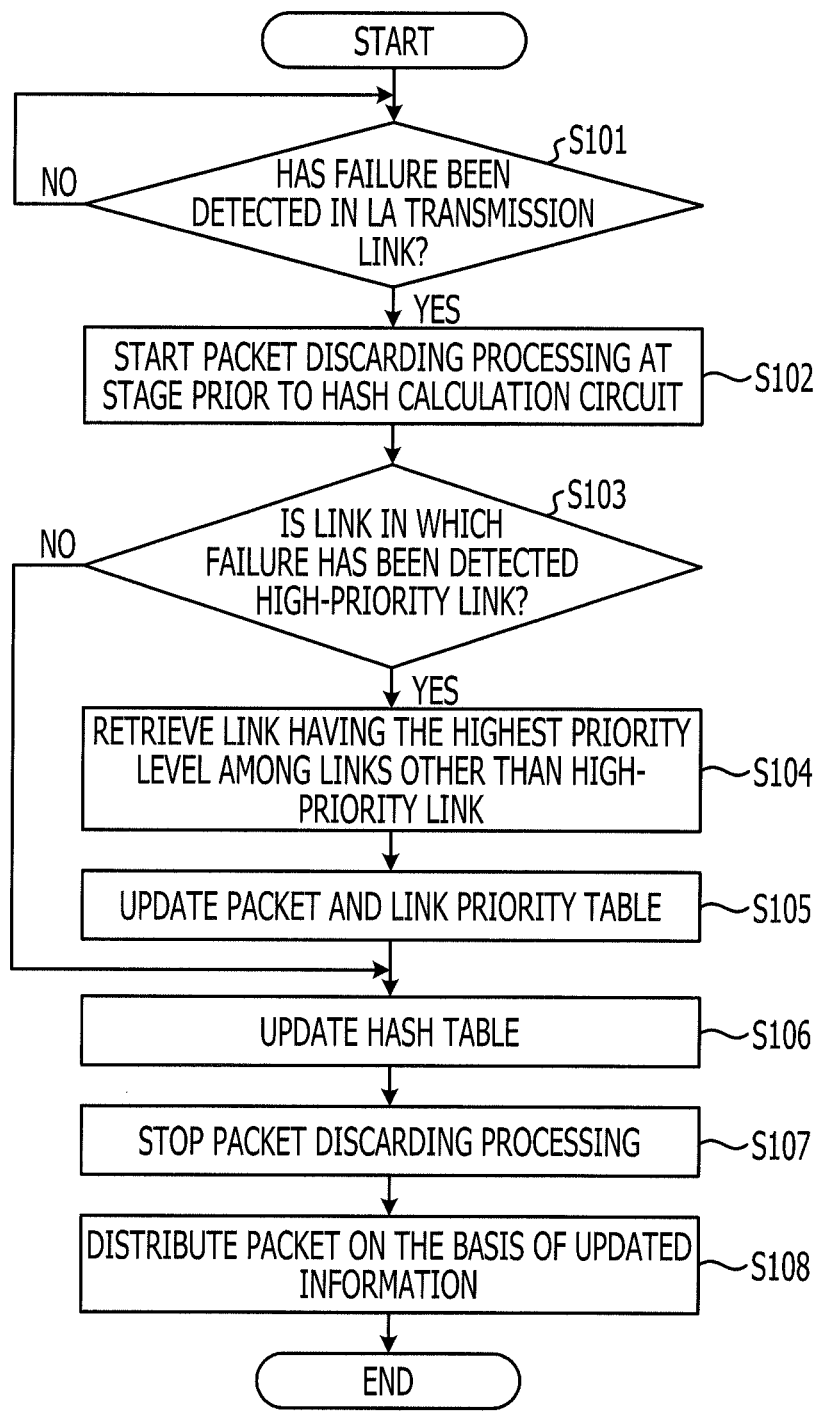
FIG. 19 is a flowchart illustrating an example of a packet distribution process when a failure occurs.

Next, a packet distribution process when a failure occurs will be described with reference to FIG. 19. FIG. 19 is a flowchart illustrating an example of a packet distribution process when a failure occurs.

For example, as illustrated in FIG. 19, if the communication apparatus 100 detects a failure in an LA transmission link (YES in step S101), the communication apparatus 100 starts packet discarding processing at a stage prior to the hash calculation circuit 118 (step S102). If the communication apparatus 100 does not detect a failure in an LA transmission link (NO in step S101), the communication apparatus 100 waits until a failure is detected.

The communication apparatus 100 determines whether an LA transmission link in which a failure has been detected is a high-priority LA transmission link (step S103). If the link identification information of the LA transmission link in which a failure has been detected is stored in the packet and link priority table 116, the communication apparatus 100 determines that the LA transmission link is a high-priority LA transmission link. If the LA transmission link in which a failure has been detected is a high-priority LA transmission link (YES in step S103), the communication apparatus 100 retrieves from the link priority table 114 the link identification information of an LA transmission link having the highest priority level from LA transmission links other than the one or more high-priority LA transmission links (step S104).

The communication apparatus 100 sets, in the packet and link priority table 116, the retrieved link identification information as an LA transmission link to which a packet having the priority level of "high" is transmitted (step S105). The communication apparatus 100 updates the hash table 120 for the remaining low-priority links (step S106). The communication apparatus 100 stops the packet discarding processing performed at a stage prior to the hash calculation circuit 118 (step S107). The communication apparatus 100 distributes a packet to an LA transmission link based on information stored in the packet and link priority table 116 and the hash table 120 (step S108).

If the communication apparatus 100 determines that the LA transmission link in which a failure has been detected is a low-priority LA transmission link (NO in step S103), the communication apparatus 100 updates the hash table 120 for the remaining low-priority links (step S106). At that time, the communication apparatus 100 does not stop the distribution of a packet to a high-priority LA transmission link.

Figure 20:
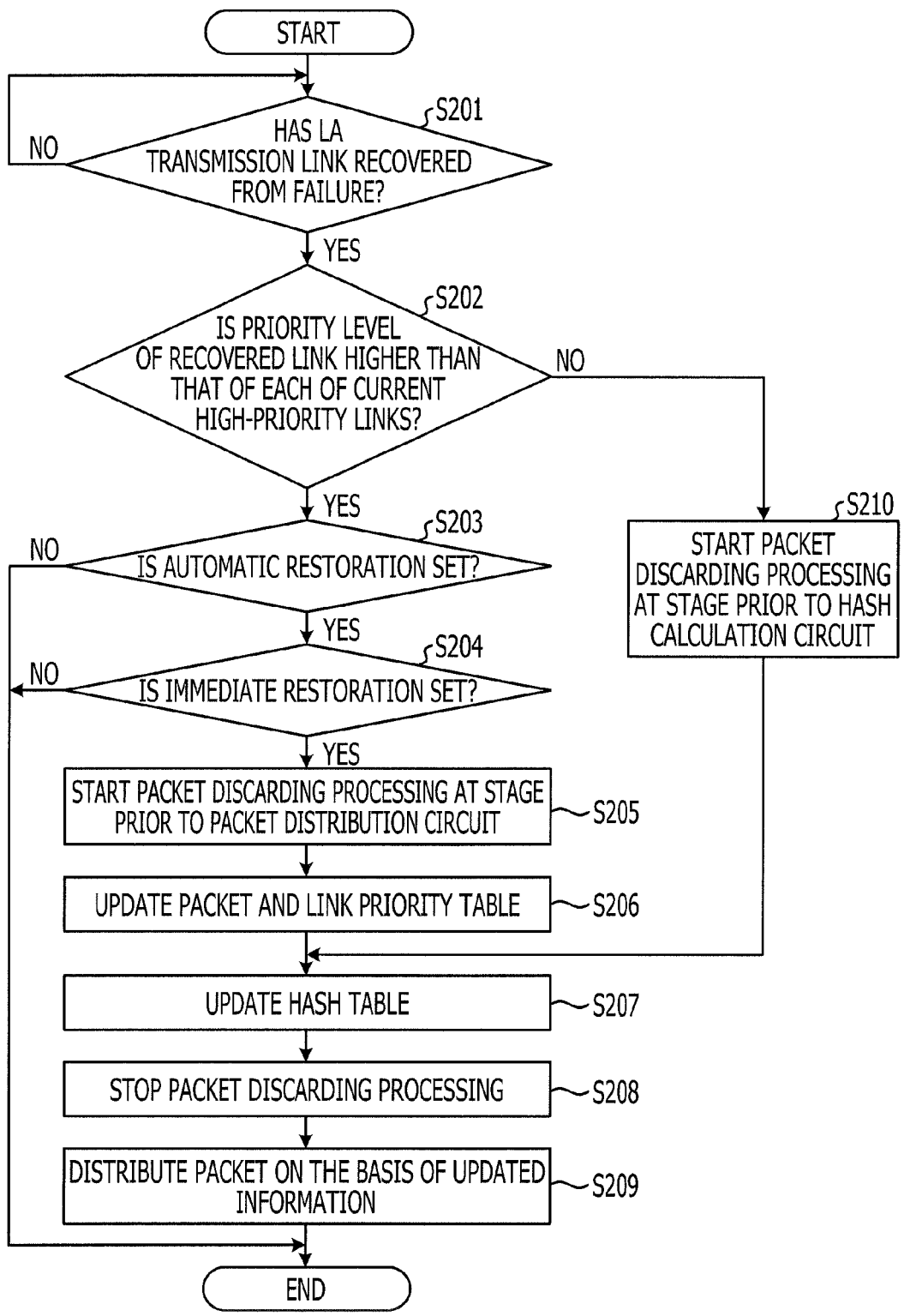
FIG. 20 is a flowchart illustrating an example of a packet distribution process when recovering from a failure.

Next, a packet distribution process according to the embodiment when recovering from a failure will be described with reference to FIG. 20. FIG. 20 is a flowchart illustrating an example of a packet distribution process when recovering from a failure.

For example, as illustrated in FIG. 20, if the LA transmission link recovers from the failure (YES in step S201), the communication apparatus 100 determines whether the priority level of the recovered LA transmission link is higher than the priority level of each of the current high-priority LA transmission links (step S202). As part of the priority level determination, for example, the communication apparatus 100 refers to the link priority table 114 and compares the priority level of the recovered LA transmission link to the priority level of each of the current high-priority LA transmission links.

If the communication apparatus 100 determines that the priority level of the recovered LA transmission link is higher than that of a high-priority LA transmission link (YES in step S202), the communication apparatus 100 determines whether automatic restoration is set (step S203). If automatic restoration is set, the communication apparatus 100 performs restoration processing. If automatic restoration is not set, an administrator or the like manually performs restoration processing. If the automatic restoration is set (YES in step S203), the communication apparatus 100 determines whether immediate restoration is set (step S204). If immediate restoration is set, the communication apparatus 100 performs restoration processing. If the immediate restoration is not set, the communication apparatus 100 performs restoration processing after a given period of time has elapsed, or an administrator or the like manually performs restoration processing.

If immediate restoration is determined to be set (YES in step S204), the communication apparatus 100 starts the packet discarding processing at a stage prior to the packet distribution circuit 117 (step S205). The communication apparatus 100 sets the recovered LA transmission link as a new high-priority LA transmission link, and updates the packet and link priority table 116 by changing the identification information of a current high-priority LA transmission link to the identification information of the recovered LA transmission link (step S206). The current high-priority LA transmission link whose identification information had been stored in the packet and link priority table 116 is set as a new low-priority LA transmission link.

Since a new low-priority LA transmission link is generated, the communication apparatus 100 updates the hash table 120 (step S207). When updating the hash table 120, the communication apparatus 100 performs the packet discarding processing at a stage prior to the hash calculation circuit 118 and stops the packet discarding processing after the updating of the hash table 120 has been completed. The communication apparatus 100 stops the packet discarding processing performed at the stage prior to the packet distribution circuit 117 (step S208). The communication apparatus 100 distributes a packet to an LA transmission link based on information stored in the packet and link priority table 116 and the hash table 120 (step S209).

If the communication apparatus 100 determines that the priority level of the recovered LA transmission link is lower than that of each high-priority LA transmission link (NO in step S202), the communication apparatus 100 starts the packet discarding processing at a stage prior to the hash calculation circuit 118 (step S210). That is, the recovered LA transmission that has been determined to have a low priority level was a low-priority LA transmission link before the occurrence of the failure. Since a low-priority LA transmission link is generated after the recovery from the failure, the communication apparatus 100 updates the hash table 120 (step S207). The communication apparatus 100 stops the packet discarding processing performed at a stage prior to the hash calculation circuit 118 (step S208). The communication apparatus 100 distributes a packet to an LA transmission link based on information stored in the updated hash table 120 (step S209). That is, the restoration of the low-priority LA transmission link does not affect the distribution of packets to a high-priority LA transmission link. If automatic restoration is not set (NO in step S203), or immediate restoration is not set (NO in step S204), the communication apparatus 100 ends the process.

As described previously, the communication apparatus 100 distributes a packet to a high-priority link that is set as a link to which a high-priority packet is transmitted, and under certain conditions distributes a low-priority packet to a low-priority link. Accordingly, it may be possible to suppress short interruptions of communication in a high-priority physical line. That is, since the communication apparatus 100 distributes a packet to a high-priority link under conditions different from conditions employed for the distribution of a packet to a low-priority link, it may be possible to suppress short interruptions of communication in a high-priority physical line when compared to the related art, which uses the same conditions to distribute packets to all links. With the related art, since packets are distributed to all links under the same conditions, a short interruption of communication may occur while the conditions are updated in response to an event, such as a change in a link configuration. In contrast, since the communication apparatus 100 distributes a high-priority packet, for which preferential transmission is desired, to a high-priority link under conditions different from conditions for low-priority links, a failure occurring in one of the low-priority links does not affect the high-priority link. As a result, the communication apparatus 100 may ensure high-quality packet transmission.

For example, if a failure occurs in a high-priority link, the communication apparatus 100 sets a low-priority link having the highest priority level among the low-priority links as a new high-priority link and distributes a packet to the new high-priority link under conditions different from conditions for the other low-priority links. As a result, while information about the distribution of a packet to a low-priority link is updated, the communication apparatus 100 may switch a link to which the high-priority packet is transmitted more quickly when compared to the related art with which short interruptions of communication may occur.

Although the communication apparatus 100 according to the above-described embodiment has been described, other embodiments, each with a different form, may also be used. Other embodiments that differ from the above-described embodiment with regard to the setting of a high-priority link, recovery from a failure, distribution of a packet to a low-priority link, and configuration will be described below.

In the above-described embodiment, a high-priority link is set in advance. A high-priority link may be designated by an administrator, or a link having a low risk of failure may be set as a high-priority link. A link having a low risk for the occurrence of a failure is, for example, a link that has a small of errors caused by failure occurs, has a brief or no history of breakdown, and has a recent date of manufacture. Based on information relevant to determining low risk of failure, the communication apparatus 100 constructs the connection between the communication apparatus 100 and each LA transmission link and sets the link priority table 114.

In the above-described embodiment, quick switching between links at the time of recovery from a failure has been described, but switching may be performed with different timing. For example, the communication apparatus 100 may perform the switching between links based on factors such as the time elapsed since recovery from failure, or a set time.

In the above-described embodiment, switching a current high-priority link and a recovered link at the time of recovery from a failure has been described. However, if the priority order of the recovered link is higher than each of the priority orders of a plurality of current high-priority links, the switching may be performed using any one of the current high-priority links. After switching links, the communication apparatus 100 updates the link priority table 114.

In the above-described embodiment, the distribution of a packet to a low-priority link is performed based on a result of hash calculation but the distribution of a packet to a low-priority link may be performed with a given method. For example, a packet may be distributed based on priority levels set for low-priority links. The communication apparatus 100 may distribute a packet based on the link priority orders of low-priority links stored in the link priority table 114 and the priority level of the packet stored in the packet and link priority table 116.

It is possible to optionally change information, described previously and illustrated in the drawings (for example, information stored in the packet and link priority table 116), including processing procedures, control procedures, specific names, various pieces of data, and various parameters, unless otherwise specified. For example, the packet and link priority table 116 may store pieces of link identification information such as "medium" and "low", and the distribution of a packet to a low-priority link may be performed based on the pieces of link identification information.

Each illustrated component for the communication apparatus 100 and related paraphernalia is a functional concept and these components may not necessarily be constituted physically as illustrated in the drawings. That is, the dispersion or integration of these components is not limited to that illustrated in the drawings, and all or a part of these components may be functionally or physically dispersed or integrated in an optional unit in accordance with factors such as various types of loads or operating conditions. For example, the hash calculation circuit 118, the LA setting circuit 119, and the hash table 120 are used for the distribution of a packet to a low-priority link, which is performed using a hash value. Therefore, if a packet is distributed to a low-priority link without using a hash value, either one or more components for performing corresponding processing may be included, or the LA distribution circuit 121 may perform the corresponding processing.

The MAC learning table 110, the CoS conversion table 112, the link priority table 114, the packet and link priority table 116, and the hash table 120, for example, may be realized with a storage medium such as a memory. The MAC search circuit 111, the CoS conversion circuit 113, the priority setting circuit 115, the packet distribution circuit 117, the hash calculation circuit 118, the LA setting circuit 119, and the LA distribution circuit 121, for example, may be realized with a semiconductor chip including an integrated circuit, for example, a field programmable gate array (FPGA) or an application specific integrated circuit (ASIC).

Alternatively, the functions of the MAC search circuit 111, the CoS conversion circuit 113, the priority setting circuit 115, the packet distribution circuit 117, the hash calculation circuit 118, the LA setting circuit 119, and the LA distribution circuit 121 may be performed by one or more programs which are stored in a storage medium such as a memory connected to a processor such as a central processing unit (CPU) and are read out into the processor. A single processor or a plurality of processors may be included in accordance with the type of processing to be performed.

Figure 21:
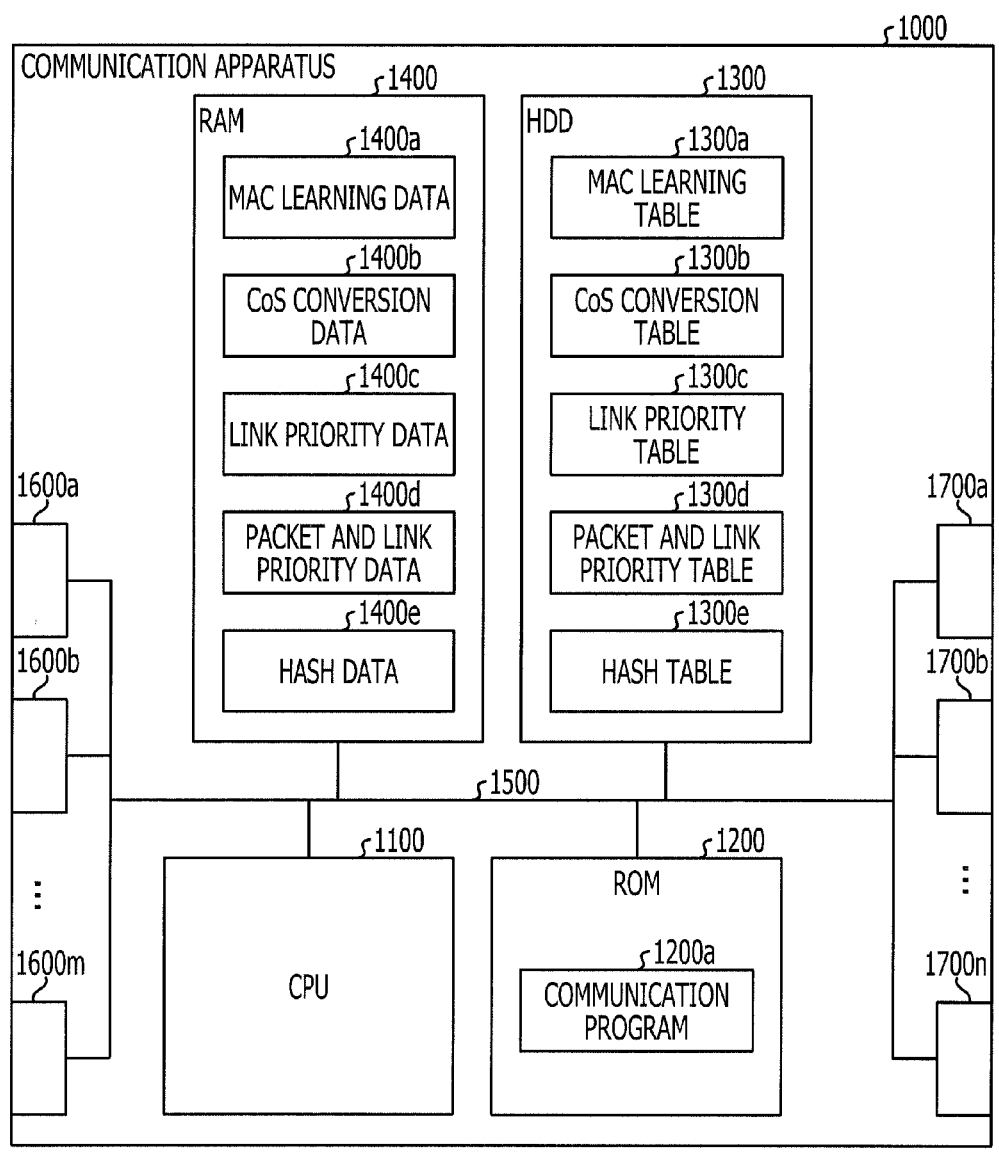
FIG. 21 is a diagram illustrating an example hardware configuration of a communication apparatus.

FIG. 21 is a diagram illustrating an example hardware configuration of a communication apparatus. As illustrated in FIG. 21, a communication apparatus 1000 includes a central processing unit (CPU) 1100, a read-only memory (ROM) 1200, a hard disk drive (HDD) 1300, and a random access memory (RAM) 1400. The communication apparatus 1000 has links 1600a to 1600m (where "m" is a positive integer) and links 1700a to 1700n (where "n" is a positive integer). These pieces of hardware 1100 to 1700n are connected one another via a bus 1500.

A program for performing functions similar to those of functional units according to the embodiment are stored in the ROM 1200 in advance. That is, as illustrated in FIG. 21, a communication program 1200a is stored in the ROM 1200. The communication program 1200a may be isolated as appropriate. The CPU 1100 reads the communication program 1200a from the ROM 1200 and executes the communication program 1200a. The HDD 1300 stores a MAC learning table 1300a, a CoS conversion table 1300b, a link priority table 1300c, a packet and link priority table 1300d, and a hash table 1300e.

The MAC learning table 1300a, the CoS conversion table 1300b, the link priority table 1300c, the packet and link priority table 1300d, and the hash table 1300e correspond to the MAC learning table 110, the CoS conversion table 112, the link priority table 114, the packet and link priority table 116, and the hash table 120, respectively, which are illustrated in FIG. 1. The links 1600a to 1600m correspond to the receiving links 101 to 104 illustrated in FIG. 1. The links 1700a to 1700n correspond to the transmission links 105 and 106 illustrated in FIG. 1.

The CPU 1100 reads out the tables 1300a to 1300e and stores them in the RAM 1400. Furthermore, the CPU 1100 executes the communication program with MAC learning data 1400a, CoS conversion data 1400b, link priority data 1400c, packet and link priority data 1400d, and hash data 1400e which are stored in the RAM 1400.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus, comprising:
a high-priority link configured to transmit one or more high-priority packets that have a priority level greater than or equal to a given level;
a plurality of low-priority links;
a memory which is configured to store link identification information for each of the plurality of low-priority links, a plurality of link priority levels, each of the plurality of link priority levels corresponding to one of the plurality of low-priority links and at least two of the plurality of link priority levels being different from each other, and a plurality of hash values, each of which are represented by a numerical value, each of the plurality of hash values corresponding to one of the plurality of low-priority links, and
a processor coupled to the memory and which is configured to:
when a failure occurs in the high-priority link, acquire, from the memory, the link identification information of a low-priority link of the plurality of low-priority links, in which the low-priority link has the highest priority level among the plurality of low-priority links,
set the low-priority link corresponding to the acquired link identification information as a new high-priority link,
delete a hash value corresponding to the new high-priority link from the plurality of hash values,
reset the plurality of hash values to make each of the plurality of hash values correspond to one of the plurality of low-priority links except for the new high-priority link, and
distribute the one or more high-priority packets to the new high-priority link.

2. The communication apparatus according to claim 1, wherein the processor is configured to:
when the high-priority link has recovered from the failure, acquire a link priority level of the recovered high-priority link from the memory, and
when the acquired link priority level is higher than the link priority level of the current high-priority link, set the current high-priority link as a low-priority link and the recovered high-priority link as a new high-priority link, and
distribute the one or more high-priority packets to the new high-priority link.

3. The communication apparatus according to claim 1, wherein the high-priority link has a lower risk of failure than the plurality of low-priority links.

4. The communication apparatus according to claim 1, wherein the processor is further configured to distribute one or more low priority packets that have a priority level less than the given level to one of the plurality of low-priority links except for the new high-priority link, based on the updated plurality of hash values.

5. A packet distribution method performed by a computer, comprising:
storing in a memory, link identification information for each of a plurality of low-priority links, a plurality of link priority levels, each of the plurality of link priority levels corresponding to one of the plurality of low-priority links and at least two of the plurality of link priority levels being different from each other, and a plurality of hash values, each of which are represented by a numerical value, each of the plurality of hash values corresponding to one of the plurality of low-priority links;
when a failure occurs in a high-priority link, acquiring, from the memory, the link identification information of a low-priority link of the plurality of low-priority links, in which the low-priority link has the highest priority level among the plurality of low-priority links,
setting the low-priority link corresponding to the acquired link identification information as a new high-priority link;
deleting a hash value corresponding to the new high-priority link from the plurality of hash values;
resetting the plurality of hash values to make each of the plurality of hash values correspond to one of the plurality of low-priority links except for the new high-priority link; and
distributing the one or more high-priority packets to the new high-priority link.

6. The packet distribution method according to claim 5, further comprising:
acquiring, after the high-priority link has recovered from the failure, a link priority level of the recovered high-priority link from the memory;
setting the current high-priority link as a low-priority link and the recovered high-priority link as a new high-priority link when the acquired link priority level is higher than a link priority level of the current high-priority link; and
distributing the one or more high-priority packets to the new high-priority link.

7. The packet distribution method according to claim 5, further comprising:
determining the high-priority link and the plurality of low-priority links based on a risk of failure.

8. The packet distribution method according to claim 5, further comprising:
distributing one or more low priority packets that have a priority level less than the given level to one of the plurality of low-priority links except for the new high-priority link, based on the updated plurality of hash values.

9. A communication apparatus comprising:
a high-priority link configured to transmit one or more high-priority packets that have a priority level greater than or equal to than a given level;
a plurality of low-priority links;
a memory which is configured to store link identification information for each of the plurality of low-priority links, a plurality of link priority levels, each of the plurality of link priority levels corresponding to one of the plurality of low-priority links and at least two of the plurality of link priority levels being different from each other, and a plurality of hash values, each of which are represented by a numerical value, each of the plurality of hash values corresponding to one of the plurality of low-priority links;
a first priority setting circuit configured to:
when a failure occurs in the high-priority link, acquire, from the memory, the link identification information of a low-priority link of the plurality of low-priority links, in which the low-priority link has the highest priority level among the plurality of low-priority links,
set the low-priority link corresponding to the acquired link identification information as a new high-priority link,
delete a hash value corresponding to the new high-priority link from the plurality of hash values,
reset the plurality of hash values to make each of the plurality of hash values correspond to one of the plurality of low-priority links except for the new high-priority link; and
a packet distribution circuit configured to distribute the one or more high-priority packets to the new high-priority link.

10. The communication apparatus according to claim 9, wherein the priority setting circuit is configured to:
when the high-priority link has recovered from the failure, acquire a link priority level of the recovered high-priority link from the memory, and
when the acquired link priority level is higher than the link priority level of the current high-priority link, set the current high-priority link as a low-priority link and the recovered high-priority link as a new high-priority link; and
the packet distributing circuit is configured to distribute the one or more high-priority packets to the new high-priority link.

11. The communication apparatus according to claim 9, wherein the first priority setting circuit is further configured to distribute one or more low priority packets that have a priority level less than the given level to one of the plurality of low-priority links except for the new high-priority link, based on the updated plurality of hash values.

* * * * *